(12) United States Patent
Masera et al.

(10) Patent No.: US 7,091,974 B2
(45) Date of Patent: Aug. 15, 2006

(54) METHOD FOR SELECTING AND DISPLAYING A SUBJECT OR INTEREST IN A STILL DIGITAL IMAGE

(75) Inventors: Eric Masera, Paris (FR); Valery J. Risson, Paris (FR)

(73) Assignee: Eastman Kodak Company, Rochester, NY (US)

( * ) Notice: Subject to any disclaimer, the term of this patent is extended or adjusted under 35 U.S.C. 154(b) by 346 days.

(21) Appl. No.: 10/306,021

(22) Filed: Nov. 27, 2002

(65) Prior Publication Data

US 2003/0103247 A1 Jun. 5, 2003

(30) Foreign Application Priority Data

Nov. 30, 2001 (FR) .................................. 01 15477

(51) Int. Cl.
*G06T 17/00* (2006.01)
*G09G 5/00* (2006.01)
*G09G 5/10* (2006.01)

(52) U.S. Cl. ...................... 345/428; 345/620; 345/625; 345/660; 345/670; 345/698

(58) Field of Classification Search ................ 345/625, 345/636, 660, 667, 670, 698, 428, 620, 2.3
See application file for complete search history.

(56) References Cited

U.S. PATENT DOCUMENTS

| | | | | |
|---|---|---|---|---|
| 4,124,871 A | * | 11/1978 | Morrin II | 358/444 |
| 4,716,404 A | * | 12/1987 | Tabata et al. | 345/625 |
| 4,763,279 A | * | 8/1988 | Kellam et al. | 358/1.9 |
| 4,891,634 A | * | 1/1990 | Ina et al. | 345/698 |
| 5,051,927 A | * | 9/1991 | Tada et al. | 345/418 |
| 5,204,959 A | * | 4/1993 | Sakuragi | 345/660 |
| 5,253,338 A | * | 10/1993 | Tanaka | 345/629 |
| 5,283,557 A | * | 2/1994 | Memarzadeh | 345/698 |
| 5,517,209 A | * | 5/1996 | Holland et al. | 715/788 |
| 5,557,728 A | * | 9/1996 | Garrett et al. | 715/801 |
| 5,572,259 A | * | 11/1996 | Nohara | 348/441 |

(Continued)

FOREIGN PATENT DOCUMENTS

EP 0 982 668 3/2000

(Continued)

OTHER PUBLICATIONS

"Rajicon: Remote PC GUI Operations Via Constricted Moble Interfaces", Norman Makoto Su, Yutaka Sakane, Masahiko Tsukamoto, Shojiro Nishio, ACM 1-58113-486-X/02/0009, MOBICOM'02, Sep. 23-28, 2002.*

(Continued)

*Primary Examiner*—Ulka Chauhan
*Assistant Examiner*—Roberta Prendergast
(74) *Attorney, Agent, or Firm*—David A. Novais; Roland R. Schindler, II (57) ABSTRACT

The present invention is in the field of digital imaging. It relates to a method for determining the coordinates of a subject of interest in a digital image, so as to be able to then display this subject of interest on the screen of a terminal with low display capacity. The present invention enables, from the screen of a terminal with sufficient display capacity, at least one subject of interest in an original still digital image to be selected, and the coordinates of said subject of interest to be determined. The application of the present invention consists in preparing the display operation of subjects of interest of digital images on the screens of terminals with low display capacity.

6 Claims, 3 Drawing Sheets

U.S. PATENT DOCUMENTS

| | | | | |
|---|---|---|---|---|
| 5,602,715 | A | * | 2/1997 | Lempicki et al. ............ 361/680 |
| 5,668,566 | A | * | 9/1997 | Yen ............................. 345/2.3 |
| 5,682,529 | A | * | 10/1997 | Hendry et al. ............... 713/100 |
| 5,721,565 | A | * | 2/1998 | Nguyen ....................... 345/660 |
| 5,745,178 | A | * | 4/1998 | Hartung et al. ......... 375/240.04 |
| 5,838,906 | A | * | 11/1998 | Doyle et al. ................. 709/202 |
| 5,920,327 | A | * | 7/1999 | Seidensticker, Jr. ......... 345/561 |
| 5,952,994 | A | * | 9/1999 | Ong et al. .................... 345/668 |
| 6,023,262 | A | * | 2/2000 | Eglit ............................ 345/667 |
| 6,172,766 | B1 | * | 1/2001 | Honma ........................ 358/1.2 |
| 6,192,393 | B1 | * | 2/2001 | Tarantino et al. ............ 709/203 |
| 6,215,485 | B1 | * | 4/2001 | Phillips ....................... 345/698 |
| 6,281,874 | B1 | * | 8/2001 | Sivan et al. .................. 345/660 |
| 6,396,507 | B1 | * | 5/2002 | Kaizuka et al. .............. 345/661 |
| 6,515,678 | B1 | * | 2/2003 | Boger .......................... 345/660 |
| 6,563,513 | B1 | * | 5/2003 | Yu et al. ...................... 345/698 |
| 6,724,948 | B1 | * | 4/2004 | Lippincott ................... 382/298 |
| 6,747,667 | B1 | * | 6/2004 | Huntington .................. 345/660 |
| 7,006,091 | B1 | * | 2/2006 | Masera et al. ............... 345/428 |
| 2001/0047517 | A1 | * | 11/2001 | Christopoulous et al. ..... 725/87 |
| 2002/0143972 | A1 | * | 10/2002 | Christopoulos et al. ..... 709/231 |
| 2002/0151283 | A1 | * | 10/2002 | Pallakoff ....................... 455/90 |
| 2002/0154801 | A1 | * | 10/2002 | Ohishi .......................... 382/132 |
| 2003/0068074 | A1 | * | 4/2003 | Hahn ........................... 382/128 |
| 2003/0080974 | A1 | * | 5/2003 | Grosvenor et al. .......... 345/622 |
| 2003/0132948 | A1 | * | 7/2003 | Bhogal et al. ............... 345/660 |

FOREIGN PATENT DOCUMENTS

| | | |
|---|---|---|
| WO | 01 59706 A | 4/2001 |
| WO | 01 75776 A | 10/2001 |
| WO | WO 200175776 A1 * | 10/2001 |
| WO | WO 2056563 A2 * | 7/2002 |
| WO | WO 3003303 A2 * | 1/2003 |

OTHER PUBLICATIONS

Harald Schroer, "The barycenter", 2001, http://www.rzuser.uni-heidelberg.de/~c07/s38/en.pdf.*

Hanes Hartenstein, "Region-Based Fractal Image Compression", IEEE Transactionon Image Processing; vol. 9, No. 7, Jul. 2000.*

Stoev et al., "Extracting regions of interest applying a local watershed transformation", Proc. of Conf. on Visualization '00, IEEE Visualization, IEEE Computer Society Press, pp. 21-28.*

Chuang et al., "Semiautomatic segmentation and tracking of semantic video objects", Circuits and Systems for Video Technology, IEEE Transactions on, pp. 572-584, vol. 8, Issue 5, Sep. 1998.*

Meyer, F., "Color image segmentation", Image Processing and its Applications, 1992, Int'l Conference, pp. 303-306.*

Haris et al., "Hybrid image segmentation using watersheds and fast region merging", Image Processing, IEEE Transactions on, vol. 7, Issue 12, Dec. 1998, pp. 1684-1699.*

Adams R. et al.; "Seeded region growing" IEEE Transactions on Pattern Analysis and Machine Intelligence; vol. 16, No. 6, Jun. 1994, pp. 641-647; EP002215479; ISSN: 0162-8828: section IV.

* cited by examiner

METHOD FOR SELECTING AND DISPLAYING A SUBJECT OR INTEREST IN A STILL DIGITAL IMAGE

FIELD OF THE INVENTION

The present invention is in the field of digital imaging. The present invention relates to a method that enables the selection of a subject of interest in a digital image for displaying it in good conditions on terminal screens with low display capacity, and especially the screens of portable terminals.

BACKGROUND OF THE INVENTION

The combined development of networks, wireless communication means, terminals equipped with display screens and interface systems enabling these means to work together, provides users with the possibility of choosing and exchanging digital images through a network such as for example the internet. The screens of these terminals, and especially the screens of portable terminals, do not always have sufficient capacity to display directly an image with relatively high definition, given the number of displayable colors (for screens displaying colors) and the too restricted number of display pixels. "Low" display capacities are for example in the order of 96 by 44 pixels (NOKIA cell phone), 160 by 160 pixels (PALM Personal Digital Assistant). Consequently, the retrieved image, displayed for example on a cell phone screen, is often hardly, or even not, useable visually. All the more so, part of the image constituting a special area of interest of the whole image displayed on the cell phone screen, is even less useable visually by a user of the telephone. Therefore it is of interest for the user to be able to view in good conditions all the special areas, or the subjects of interest of an original image.

Therefore, in order to visually use an image on terminal screens with low display capacity, the image rendering needs to be improved, i.e. obtain the best possible quality of retrieval, given the fact that these devices offer poor display capacities. This improvement of the plotting can be provided by manually cutting out the subject of interest in the original digital image; but this technique has the major disadvantage of requiring prior knowledge of the shape factor of the display of the terminal with low display capacity used to view the image. An automatic means, independent of the terminal with low display capacity used, is thus desirable to determine and display the subject of interest.

SUMMARY OF THE INVENTION

The present invention relates to a method for selecting and recording at least one subject of interest in an original still digital image, the method comprising the following steps:
a) perform a request for the original image from a terminal whose display capacity enables the display of the original image,
b) display the original image on the screen of the terminal,
c) select a subject of interest in the original image, displayed on the terminal's screen,
d) automatically determine the coordinates of the subject of interest in the original image;
e) automatically load in a server the original image and the coordinates, in the original image, of the subject of interest,
f) automatically save in the server the original image and the coordinates of the subject of interest.

The invention method also enables the selection of a subject of interest in an original image, neighboring the barycenter of several homogeneous entities forming a subject of interest of the original image, and in which the image displayed on the screen of the terminal with low display capacity includes several entities forming the subject of interest.

It is the purpose of the present invention to provide a simplified user interface, that is user friendly and enables the optimization of the rendering of digital images, by displaying on the screen of a terminal with low display capacity, only parts, or subjects of interest, of an original digital image; this display corresponds to the visual exploitation of the image desired by the user of the terminal with low display capacity. Thus the best quality of plotting of the subjects of interest can be obtained, while reducing the number of manual operations for the user. The present invention enables improvement of the legibility and thus quality of the image displayed on the screen of the terminal with low display capacity; for example a zoom-in is performed to select the subject or the area of the original image that has a special interest. This selection of the subject of interest can be performed manually through the network interface for example, but this is not very user friendly. Conversely, the use of methods using fully automatic processing algorithms is not very robust and sometimes provides poor results, in terms of the transfer of digital images on terminals with low display capacity.

Other characteristics and advantages of the invention will appear on reading the following description, with reference to the drawings illustrating the invention.

DETAILED DESCRIPTION OF THE INVENTION

Figure 1:
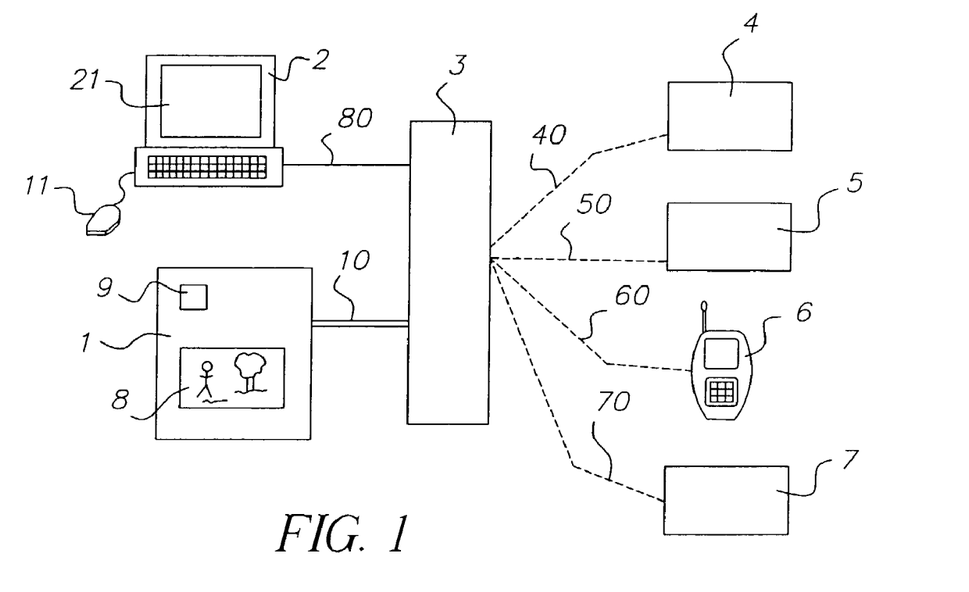
FIG. 1 represents diagrammatically a hardware environment of the system for implementing the invention.

The present invention is implemented in the environment diagrammatically represented by FIG. 1, and comprising a set of devices communicating one with another. A main server or terminal 1 enables the access to still digital images, forming part for example of a database of images stored or saved in the server. The digital images 8 saved in this database have relatively high definition. The server 1 is linked through a specific high rate link 10, via an interface device 3, to a network such as the internet. This enables for example the images at a URL address (Uniform Resource Locator) to be retrieved. The interface device 3 enables, via a cabled link 80, the linking of the server 1 with terminals or computers 2, of PC type (Personal Computer). These terminals 2 are fitted with screens with sufficient display capacity, for example in the order of 800 by 600 pixels or more. Other specific links 40, 50, 60,70 enable, via the interface device 3, communication with terminals with low display capacity 4, 5, 6, 7 to be ensured. These terminals with low display capacity are preferably mobile wireless terminals. Links 40, 50, 60, 70 are for example WAP type (Wireless Application Protocol). Terminals with low display capacity can be for example a portable microcomputer 4, a PDA 5 (display capacity 160 by 160 pixels), a cell phone 6 (display capacity 96 by 44 pixels), a TV screen 7, or any other portable terminal fitted with a display device for digital images. All the devices described above, and forming the environment represented by FIG. 1, work together to exchange information or digital data, by running a software program. This software enables the execution of the operations described below, algorithm operations for implementing the invention method.

Figure 2:
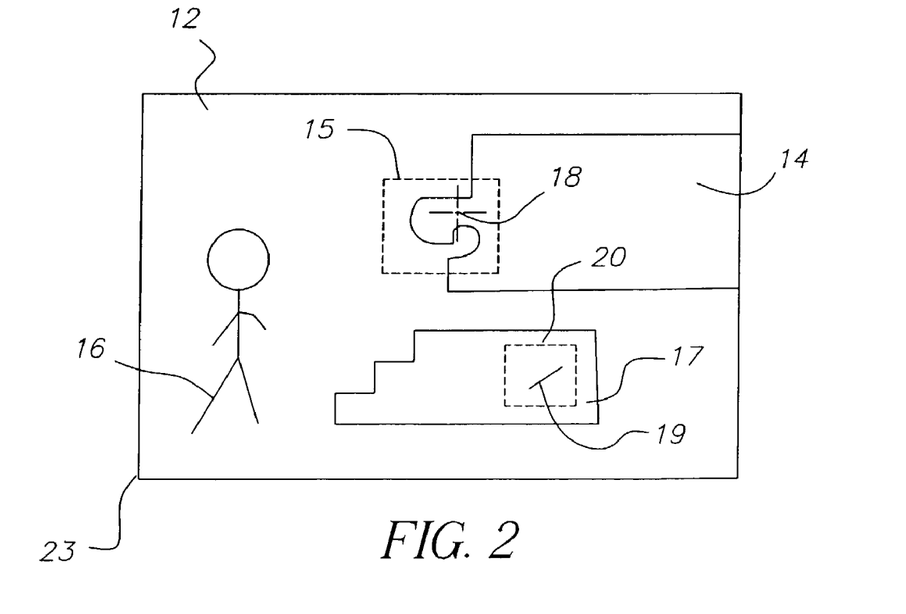
FIG. 2 represents diagrammatically a still image illustrating a selection principle of two different subjects of interest of the image.

In a first embodiment, the present invention enables a user, performing an initial request, to recover for example an original image 8 to terminal 2 with sufficient display capacity. The user sees the original image 8 on the screen 21 of the terminal 2. The terminal 2 enabling the initial request to be performed is for example a PC that enables the display, on the screen 21, of a set or subset representative of the pixels forming the original image 8 in good conditions. The user simply selects, for example by using a mouse 11 linked to the terminal 2, a subject of interest in the original image 8. This subject of interest has an interest special to the user. FIG. 2 represents two examples of the types of selection of the subject of interest with the mouse 11. Selection of the subject of interest is performed with the mouse 11, either by placing for example a point 18 approximately in the main part of a first subject of interest 15 of the original image 12, or by tracing a portion of line or a straight segment 19 approximately in the main part of a second subject of interest 20 of the image 12. From this selection of one or more subjects of interest in the original image, the rest of the invention method performs automatically, without user intervention. The invention method enables the determination, loading and then automatically saving, in the server 1, of the original image 12 and the coordinates of the markers of the subjects of interest of the image. The coordinates of the marker 18, 19 of the subject of interest represent the position of the subject of interest 15, 20 in the original image 12. The coordinates of the marker of the subject of interest are stored (saved) for example in the server 1. The coordinates are stored for example in the form of a greyscale image, in which each marker identifying a subject of interest is defined by a particular greyscale, this greyscale of the marker is differentiated from the greyscale of the image background. The coordinates of the marker of the subject of interest correspond to the pixels representing the point 18 or the line 19 in the original image 12. In the rest of the description, for simplification, the coordinates of the marker of the subject of interest will be called "coordinates of the subject of interest".

Based on the pixel data of the original digital image and the coordinates of the selected subjects of interest, the algorithm for implementing the invention method enables the original image to be analyzed to automatically determine the pixel limits 15, 20, in the original image 12, of the area of the selected subject of interest. To do this, the algorithm integrates a module enabling image segmentation operations to be performed. Segmentation enables elements or entities of a scene represented in the original digital image to be highlighted. This method, known to those skilled in the art, consists in fusing together, to form an entity or a uniform area, the pixels having a given value, or belonging to an interval of greyscale or color values. For example, the transformation called "watershed transform" is a segmentation method known to those skilled in the art, and described in the publication by F. Meyer and S. Beucher of September 1990, The Journal of Visual Communication and Image Representation, entitled, Morphological Segmentation (Academic Press, Ed.). This type of segmentation method enables the elements or entities of a digital image to be selected; the image elements or entities are selected using computer mouse type means enabling them to be pointed (point) or marked (line) on the screen.

Figure 5:
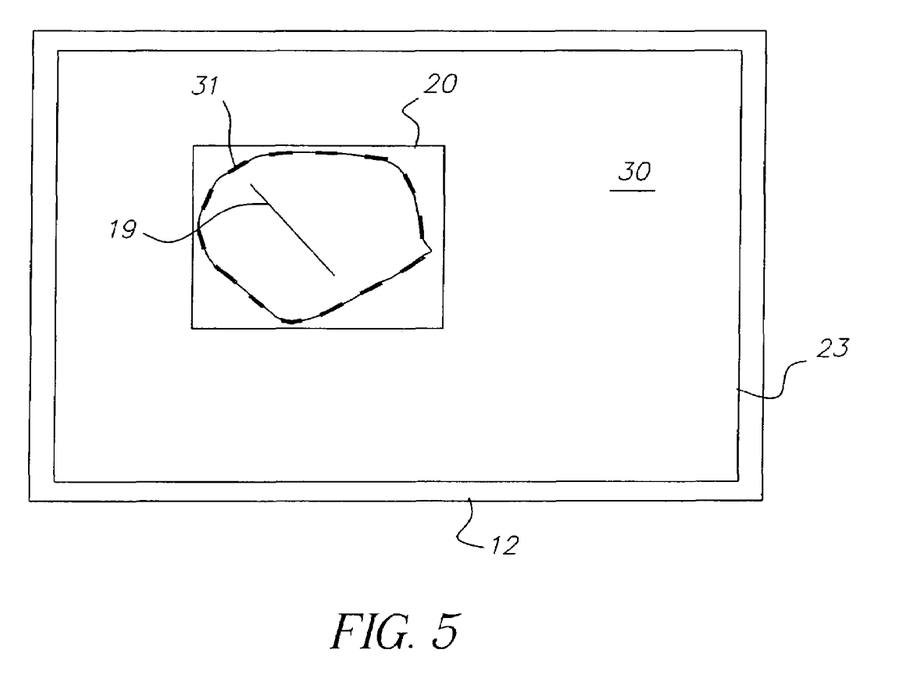
FIG. 5 represents the marking, segmentation and framing of a subject of interest in an original image.

According to a particular embodiment and according to FIG. 5, the algorithm called "watershed transform" is applied to the original image 12, 42, to select the regions or areas of interest 15, 20, 45, from the pixel gradient of the original image 12, 42, and the markers 18, 19, 44 of the regions of the image 12, 42. Another implicit marker, automatically taken into account by the algorithm, is used in any original image; this implicit marker takes into account all the edge pixels 23 of the original image 12. The implicit marker thus enables the automatic enclosing of the pixels forming the part 30 of the original image (background of the image) that has no interest. Based on the markers 19 of the subjects of interest and the marker of the background of the original image, the watershed transform performs a segmentation of the original image 12. This segmentation enables an area of outlines or limits 31 of the subject of interest to be determined. The area 31 in which the subject of interest is enclosed is called the subject-of-interest area. The pixel data of the subject-of-interest area are automatically saved, for example in a database of a server, or in the metadata of the image file if the file format enables it; or if the encoding type of the image enables it, the region of interest is encoded directly in the image file. In the case of storage of the database in a server type, the server is for example the server 1. The algorithm then enables the automatic selection and display of a framing format of the subject-of-interest region or area; this subject-of-interest area is represented for example by a polygon 20 circumscribing the limits 31 determined by the segmentation, the algorithm also enables the automatic determination of the area 30, of the background of the original image 12, which is not of any interest to the user. According to a first embodiment, in order to automatically determine the limits of the subject-of-interest area, the invention method enables the segmentation to be performed, before a second request for the original image performed from the terminal with low display capacity 4, 5, 6, 7. The step of automatic determination of the limits 31 of the area corresponding to the subject of interest is performed in a server (for example the server 1), by the segmentation module, according to the analysis of the original image and the coordinates 18, 19 of the subject of interest. Consequently, this step of determination of the limits is performed before the execution of the second request, from the terminal 4, 5, 6, 7. Based on the second request effected for example later from the terminal with low display capacity 4, 5, 6, 7, the user retrieves on this terminal 4, 5, 6, 7, the original image 12 and the coordinates of the subject of interest stored in the server 1. The algorithm of the invention method automatically determines, according to the terminal with low display capacity from which the second request is performed, an optimum format for framing the previously selected subject-of-interest area. That is, the invention method determines an optimized framing of the subject-of-interest area taking into account the display capacity of the terminal 4, 5, 6, 7.

According to a second embodiment, the invention method enables the automatic operation, from the second request performed on the terminal 4, 5, 6, 7, of the automatic determination of the limits of the subject-of-interest area, then the optimum framing format of the area. The operations of image rendering, for example filtering, trimming, decimation of the image and resizing the limits of the subject-of-interest area, are performed in real time ("on the fly"), according to the coordinates of the previously selected subject of interest. The operations of image rendering, for example filtering, trimming, decimation of the image are performed in real time ("on the fly"), according to the coordinates of the previously selected subject of interest. The user executes the second request from the terminal with low display capacity 4, 5, 6, 7. When the user executes the second request, for example HTTP, to the server 1, a header is inserted in the request. This header enables the server 1 to identify the type of terminal with low display capacity used to which to send for example digital image contents, and to format the contents appropriately. The invention method enables the user to retrieve in this way (following the second request) the optimized modified image, which represents the image of the previously selected subject of interest. The user recovers this modified image directly on the screen of their portable terminal with low display capacity. And this is with an image quality enabling the subject of interest to be viewed correctly. According to FIG. 3, the subject of interest of the original image 22 is for example either a face 24, or a particularity of a geographic site 26. According to an alternative, the embodiment of the invention is optimized, from a server database 9, for example saved in the server 1. The database 9 comprises for example the identifications and/or technical display characteristics of the various types of terminals equipped with low display capacity screens. This optimized embodiment enables, from the terminal 4, 5, 6, 7 and according to the display capacity characteristics recorded in the database 9, the automatic determination of the optimum framing format of the subject-of-interest area, immediately after the step enabling the limits of this area corresponding to the subject of interest to be determined.

The present invention provides the advantage, for the user, of being totally free to use any type of terminal with low display capacity, i.e. the display capacity of the terminal 4, 5, 6, 7 used is taken into account automatically by the invention method, at the moment when the user makes the second request on the terminal. This is to display the subject of interest according to an optimum framing enabling good quality and good viewing of the optimized modified image, on the screen of the terminal 4, 5, 6, 7. Another advantage of the invention method is to avoid the manual operation of searching and framing of the subjects of interest in the original image, while supplying the best results in terms of quality of the retrieved image on the screen of the terminal with low display capacity. The invention method thus enables the automatic determination of an optimum format of the framing area of the selected subject of interest, according to the type of terminal 4, 5, 6, 7. This operation leads to supplying an optimum format of the framing area of the subject of interest enclosing the limits 31 previously defined automatically of the area of the subject of interest during the segmentation operation. The optimum format of framing the area of the subject of interest generally reveals a little more pixel data of the subject of interest than the limits 31 of the area automatically determined during the segmentation. But, if the type of terminal 4, 5, 6, 7 requires it, the optimized framing area, enabling good viewing to be obtained on the screen of the terminal 4, 5, 6, 7, will not retrieve for example all the pixel data of the subject of interest previously determined during the segmentation. This is to favor the quality of the image rendering on the screen of the terminal 4, 5, 6, 7. However, in this last case, the algorithm minimizes the difference between the number of pixels of the subject of interest determined during the segmentation and the number of pixels of the subject of interest effectively retrieved on the screen of the terminal 4, 5, 6, 7. The user is thus not concerned with the capacity of the terminal 4, 5, 6, 7 they are using; the invention method performs the framing automatically, i.e. the ultimate adjustment to obtain the best display possible of the optimized modified image, on the terminal 4, 5, 6, 7. The user is the person who executes the second request for an original image 12, 22, 42 saved on the server 1, and which they generated. But the user is also the person who receives for example on their mobile phone 6 an image coming from another user; the original image 12, 22 42 being sent by another person, for example as an electronic postcard; this mailing is performed for example by the internet or by using the MMS environment (Multimedia Messaging Service).

FIG. 2 represents for example an original image 12 stored on the server 1. The original image 12 is for example recovered by the user (first request) on the screen 21 of the PC 2. The image 12 comprises for example three image entities 14, 16, 17. The user is for example more particularly interested in a particular element of the entity 14 located approximately in the middle of the image 12, and in a particular element of the entity 17 located towards the bottom of the image 12. The implementation of the invention method consists for the user, from the PC 2, for example using a simple click with the mouse 11, in pointing at 18 the first subject of interest 15 (particular element of the entity 14), then for example in marking with a line 19 the second subject of interest 20 (particular element of the entity 17). The line segment 19 is executed by pressing on the mouse button and moving it simultaneously between the ends of the line segment 19 (click and drag). The user can perform, for example later, a second request for the original image 12 from for example their cell phone 6, the cell phone 6 being equipped with a screen having a restricted number of display pixels, for example 96 by 44 pixels. The particular form of the entity 14, represented by its subject of interest, cannot be viewed correctly on the screen of the phone 6 if the whole of the original image 12 is displayed. This is given the level of detail of the entity 14 in the original image 12, and the insufficient display capacity of the cell phone 6 used. The invention method enables the automatic definition of the optimum framing format 15 that corresponds to the display capacity of the cell phone 6, and enables good viewing of the optimized modified image (representing the subject of interest) to be rendered on the screen of the phone 6 used.

According to the choice of the subject of interest in the original image, the algorithm of the invention method also enables the automatic determination of an appropriate framing geometry. In other words, after the segmentation operations, framing areas of the subject of interest of different forms are obtained based for example on conventional geometric forms. The framing geometry encloses the form generated by the limits of the pixel area of the "segmented" subject of interest of the original image. According to a preferred embodiment of the invention method, and according to the illustration of FIG. 3, the forms used enable areas to be defined with rectangular 26, or circular 24 shapes. But other types of framing form can also be used, for example square, elliptic, or whatever, i.e. for example polygonal and approximately following the outline of the entity characterizing the selected subject of interest. The forms to define the framing areas of the subject of interest and to thus define the optimized modified image, are programmed according to the type of subject of interest that may appear in the image, as represented for example in FIG. 3: a rectangle 26 for a landscape, a circle 24 for a face, etc.

Figure 3:
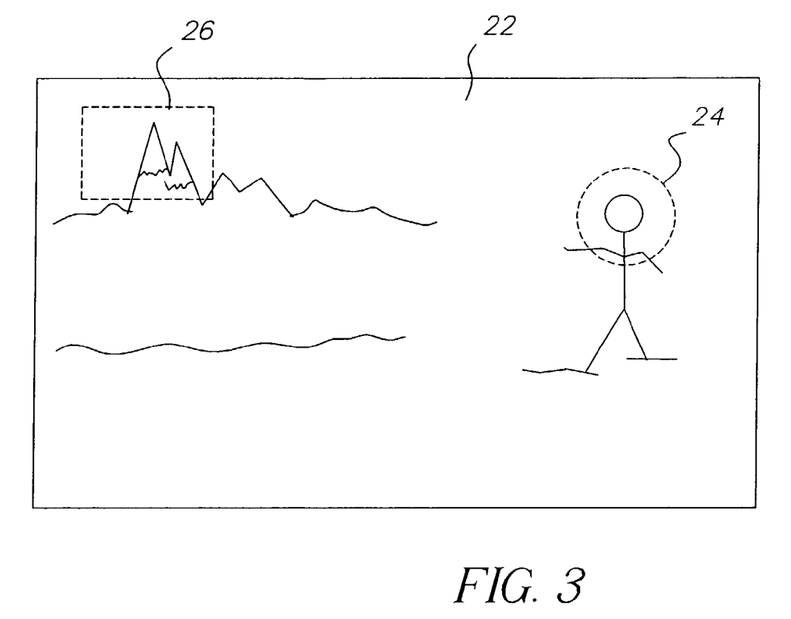
FIG. 3 represents diagrammatically a still image and different framing shapes of two subjects of interest of the image.

As illustrated in FIGS. 2 & 3, the invention method enables the successive selection of several subjects of interest 15, 20, 24, 26 in one original image 12, 22. When the user of the terminal with low display capacity wishes to retrieve these subjects of interest forming optimized modified images, to view them in good conditions on their cell phone 6 for example, they perform the (second) request for the original image from the cell phone. The invention method thus enables the automatic successive display of subjects of interest 15, 20, 24, 26 on the screen of the cell phone 6. In a preferred embodiment, the display is executed in the chronological order of the initial selections of the subjects of interest performed on the terminal 2 with sufficient display capacity. The invention method also enables the programming of any other chronology of plotting the display of the subjects of interest on the terminal 4, 5, 6, 7. Going from viewing for example the first plotted subject of interest 15 to the second subject of interest 20 is performed by a simple command executed manually by the user, from the terminal 4, 5, 6, 7, or this change is performed automatically, while following an automatic timing that is programmed and adjustable.

Figure 4:
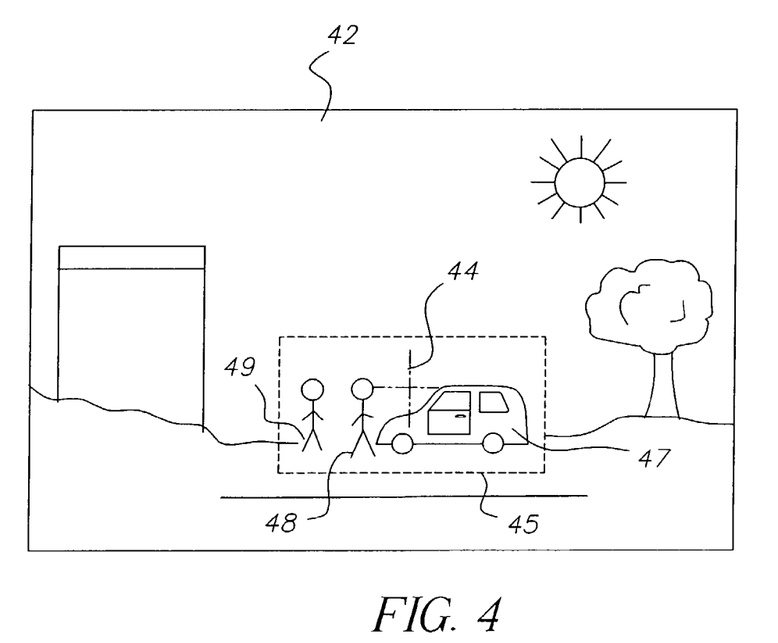
FIG. 4 represents diagrammatically a still image and the framing of a subject of interest comprising several homogeneous entities.

Another embodiment of the invention, as illustrated in FIG. 4, also applies to at least one subject of interest 45 from at least one original image 42. The subject of interest 45 comprises several homogeneous image entities 47, 48, 49. These homogenous entities represent, for the user, the interesting elements of the subject of interest 45. The concept of homogenous image entities is defined and taken into account by the algorithm of the invention method. It integrates the operations of the "watershed transform" method, known to those skilled in the art. Based on an original image 42, the user selects, for example with a simple click of the mouse 44, or by drawing a line segment with the mouse, the subject of interest 45. This subject of interest 45 corresponds for example to three homogenous entities 47, 48, 49, which interest the user together. The algorithm of the invention method enables the subject of interest 45 to be selected by clicking in the original image 42. The simple click is performed near the barycenter of the homogeneous entities 47, 48, 49. The barycenter thus defined is approximately the geometric barycenter of the selected entities 47, 48, 49. In a preferred embodiment, the user selects the subject of interest 45 by drawing a line that at least partially covers the homogenous entities 47, 48, 49. The entities 47, 48, 49 are recognized as forming together a subject of interest 45 in the original image 42, insofar as they are close and represent homogenous pixel areas having consistency of shapes or colors in relation to the neighboring pixels.

While the invention has been described with reference to preferred embodiments, it is clear that this application covers all modifications or variants which correspond with the purpose of the invention. Accordingly, the embodiments presented do not restrict the claimed protection.

What is claimed is:

1. A method for selecting and displaying at least one subject of interest comprising less than all of the image content of an original still digital image, the original image being initially displayed on a screen of a first terminal with a sufficient display capacity to provide a relatively high definition, a selected subject of interest comprising less than all of the image content of the original image being intended to be displayed on a screen of a second terminal with a low display capacity that provides a relatively low definition, said first and second terminals respectively communicating with a server, said method comprising the steps of sequentially:
   a) performing a first request for the original image from the first terminal;
   b) displaying the original image on the screen of the first terminal;
   c) selecting a subject of interest in the original image, when the original image is displayed on the screen of the first terminal;
   d) automatically determining coordinates of the selected subject of interest, which represent a position of the selected subject of interest in the original image;
   e) automatically loading in the server the original image and the coordinates of the selected subject of interest;
   f) automatically saving in the server the original image and the coordinates of the selected subject of interest;
   g) automatically determining pixel limits of an area of the selected subject of interest based on pixel data of the original image and the coordinates saved in the server;
   h) performing a second request from the second terminal to retrieve the original image and the coordinates saved in the server, and automatically determining according to the relatively low display capacity of the second terminal an optimum format for framing the area of the selected subject of interest to obtain an optimized modified image of the selected subject of interest which can be viewed correctly on the screen of the second terminal; and
   i) displaying said optimized modified image of the selected subject of interest on the screen of said second terminal.

2. The method of claim 1, wherein the subject of interest is selected by a point, placed approximately in a main part of said subject of interest.

3. The method of claim 1, wherein the subject of interest is selected by a line segment, placed approximately in a main part of said subject of interest.

4. A method for selecting and displaying at least one subject of interest comprising less than all of an original still digital image, the original image being initially displayed on a screen of a first terminal with a sufficient display capacity to provide a relatively high definition, a selected subject of interest in the original image being intended to be displayed on a screen of a second terminal with a low display capacity that provides a relatively low definition, said first and second terminals respectively communicating with a server, said method comprising the steps of sequentially:
   a) performing a first request for the original image from the first terminal;
   b) displaying the original image on the screen of the first terminal;
   c) selecting a subject of interest in the original image, when the original image is displayed on the screen of the first terminal;
   d) automatically determining coordinates of the selected subject of interest, which represent a position of the selected subject of interest in the original image;
   e) automatically loading in the server the original image and the coordinates, of the selected subject of interest;
   f) automatically saving in the server the original image and the coordinates of the selected subject of interest;
   g) performing a second request from the second terminal to retrieve the original image and the coordinates saved in the server, automatically determining pixel limits of an area of the selected subject of interest based on pixel data of the original image and the coordinates saved in the server, and automatically determining according to the relatively low display capacity of the second terminal an optimum format for framing the area of the selected subject of interest to obtain an optimized modified image of the selected subject of interest which can be viewed correctly on the screen of the second terminal; and h) displaying said optimized modified image of the selected subject of interest on the screen of said second terminal.

5. The method according to claim 1, wherein the selection of the subject of interest in the original image is performed close to a barycenter of several homogenous entities of the original image, said homogenous entities forming the subject of interest of said original image, and wherein an optimized modified image comprising the several entities of the subject of interest is displayed on the screen of the terminal with low display capacity.

6. The method of claim 5, wherein the selection of the subject of interest is performed by a line segment that covers at least partially each of the homogenous entities of said subject of interest.

* * * * *

UNITED STATES PATENT AND TRADEMARK OFFICE
CERTIFICATE OF CORRECTION

| | | |
|---|---|---|
| PATENT NO. | : 7,091,974 B2 | Page 1 of 1 |
| APPLICATION NO. | : 10/306021 | |
| DATED | : August 15, 2006 | |
| INVENTOR(S) | : Eric Masera et al. | |

It is certified that error appears in the above-identified patent and that said Letters Patent is hereby corrected as shown below:

On the Title Page (57), line 10
Abstract Replace "invention consists in preparing" with --invention includes preparing--

Signed and Sealed this

Twenty-sixth Day of December, 2006

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 7,091,974 B2 | Page 1 of 1 |
| APPLICATION NO. | : 10/306021 | |
| DATED | : August 15, 2006 | |
| INVENTOR(S) | : Eric Masera | |

It is certified that error appears in the above-identified patent and that said Letters Patent is hereby corrected as shown below:

Title Page, Item (54) and in the Specification, column 1, line 2, in the title, delete "OR" and insert --OF--

Signed and Sealed this

Seventeenth Day of June, 2014

Michelle K. Lee
*Deputy Director of the United States Patent and Trademark Office*